United States Patent [19]
Raney

[11] Patent Number: 5,091,803
[45] Date of Patent: Feb. 25, 1992

[54] MAGNIFYING ATTACHMENT FOR FLASHLIGHT WITH DARK FIELD ILLUMINATION

[76] Inventor: Gerard E. Raney, 1278 Edgewood Rd., Redwood City, Calif. 94062

[21] Appl. No.: 638,786

[22] Filed: Jan. 7, 1991

[51] Int. Cl.[5] .................................................. G02B 7/02
[52] U.S. Cl. .................................. 359/818; 359/827
[58] Field of Search ............... 350/235, 243, 245, 248, 350/249, 251, 257

[56] References Cited

U.S. PATENT DOCUMENTS

| | | | |
|---|---|---|---|
| 1,001,991 | 8/1911 | Sale. | |
| 1,925,393 | 9/1933 | Lehman | 88/39 |
| 2,178,371 | 10/1939 | Eichenberger | 88/40 |
| 2,533,747 | 12/1950 | Thienemann | 88/39 |
| 2,725,788 | 12/1955 | Pfleger | 88/39 |
| 3,936,156 | 2/1976 | Shaw et al. | 350/235 |
| 3,955,884 | 5/1976 | Del Pesco, Sr. | 350/248 |
| 4,577,927 | 3/1986 | Raney | 350/235 |
| 4,763,986 | 8/1988 | Sego | 350/235 |
| 4,906,083 | 3/1990 | Sattler | 350/524 |
| 4,917,459 | 4/1990 | Solitt et al. | 350/235 |

*Primary Examiner*—Frank Gonzalez
*Attorney, Agent, or Firm*—Flehr, Hohback, Test, Albritton & Herbert

[57] ABSTRACT

A magnifying attachment for a flashlight body includes an eyepiece viewing portion which when rotated to a 90° open position provides for dark field illumination of a gem specimen. The attachment includes a split resilient band which may be easily slipped over the end of the flashlight with the band including a folded back tab terminating in a hook which provides a half bearing into which the rotational axis of the eyepiece viewing portion may be permanently placed and retained on the flashlight. A depression or detent notch is formed on the flashlight body to retain the attachment.

7 Claims, 3 Drawing Sheets

MAGNIFYING ATTACHMENT FOR FLASHLIGHT WITH DARK FIELD ILLUMINATION

The present invention is directed to a magnifying attachment for a flashlight and more specifically, to one having dark field illumination for a gem specimen.

BACKGROUND OF THE INVENTION

As illustrated in U.S. Pat. No. 4,577,927, dark field illumination of gems has long been known as a technique for evaluating the gem and determining defects or inclusions. Such patent which is in the name of the present inventor has a viewing lens formed as part of the end of a flashlight body and when the lens is open to a 90° position provides for such dark field illumination.

U.S. Pat. No. 2,178,371 to Eichenberger shows a combination flashlight and magnifying glass for reading, for example, gas or electric meters; the magnifying glass may be flipped up and the gas meter read. Here, compared to the above Raney patent, there is no dark field illumination. The magnifying lens, however, is attached by a rather complex retrofit to the flashlight including a split resilient band and a ring in which it is retained. In other words, significant modification of the flashlight must be made.

OBJECT AND SUMMARY OF INVENTION

It is a general object of the present invention to provide an improved magnifying attachment for a flashlight body.

In accordance with the above object, there is provided a magnifying attachment having an eyepiece viewing portion for a flashlight body, the body itself having a substantially cylindrical bulb bearing portion. The attachment provides for dark field illumination of a gem specimen when the eye of a viewer observes the specimen through the eyepiece in an open viewing position to detect inclusions in the specimen. The attachment comprises a split resilient curved band slippable over the cylindrical bulb bearing end having an axis substantially coincident with the axis of the flashlight body. The resilient band tightly grips the flashlight body. The resilient band includes as a unitary part, a resilient tab going from the band toward the bulb end of the flashlight body in a plane substantially parallel to the axis of the flashlight body and biased against the flashlight body because of the resilient curved band. The tab has a hook end near the flashlight end forming a half bearing into which a rotational axis of the eyepiece viewing portion may be placed and retained by the bias. The eyepiece viewing portion is retained for rotation between an open viewing position and a closed or stowed position where the eyepiece portion is an extension of the flashlight body.

DESCRIPTION OF PREFERRED EMBODIMENTS

Figure 1:
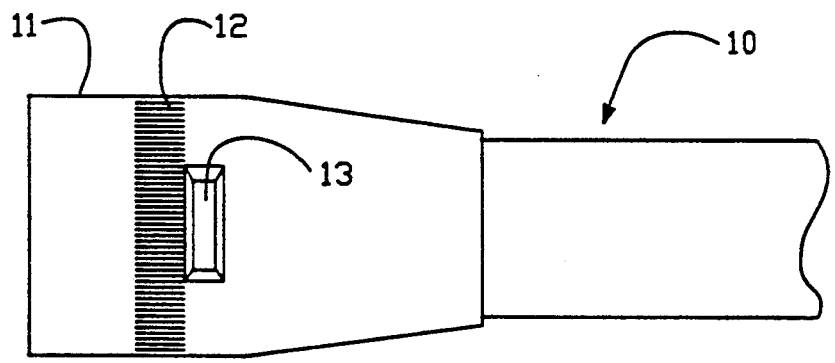
FIG. 1 is a top view of a standard flashlight body including a modification in accordance with the present invention.
Figure 2:
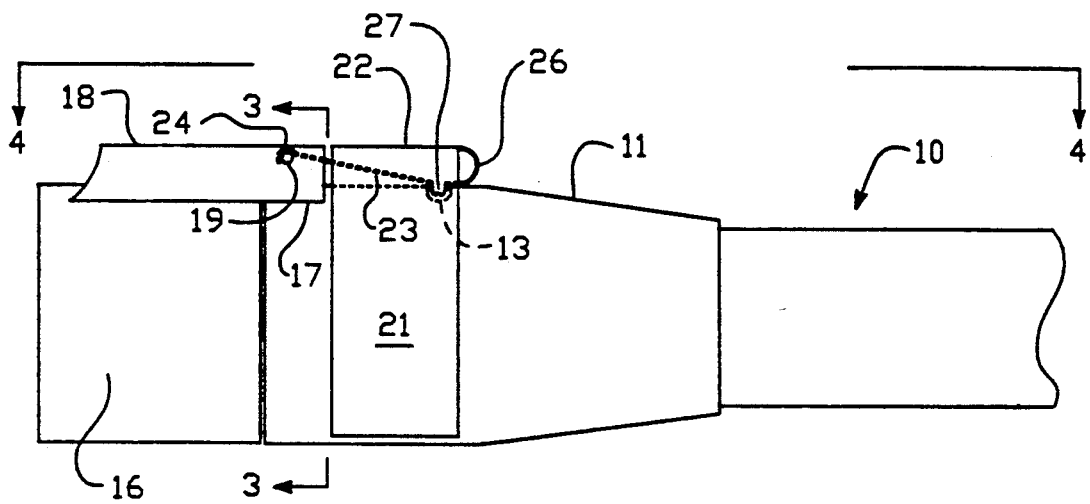
FIG. 2 is a side view of the flashlight body of FIG. 1 with the magnifying attachment of the present invention.

A typical or standard flashlight body 10 which may be used in the present invention includes a substantially cylindrical bulb bearing 11 having a knurled band 12 which when rotated will actuate or turn the light on or off. Such a flashlight which has an aluminum case and is especially suitable for the present invention is sold under the trademark MAGLITE and is manufactured by the Mag Instrument Company of Ontario, Calif. Thus far, the flashlight body bulb bearing end 11 is standard. In accordance with the invention, there is cut in end 11 an elongated depression or notch 13. This is to help retain the magnifying attachment which is shown in FIG. 2. Such attachment includes an eyepiece viewing portion 16 having a cantilevered end 17 which extends from a raised shoulder portion 18. Cantilevered end 17 carries a pin type axis 19 on which it may be rotated.

The entire eyepiece viewing portion 16-19 is removably attached to the substantially cylindrical bulb bearing end 11 by a split resilient curved band 21 which includes a raised portion 22 under which a folded back tab 23 extends back toward the bulb end 30 (see FIG. 3) of the flashlight body. The end of tab 23 has a hooked portion 24 which forms a half bearing into which axis 19 is placed and retained for rotation. Tab 23 is biased against the flashlight body or at least the end because of the curved resilient bank 21 and being folded back at point 26. Finally, as illustrated, the entire resilient band and the attached eyepiece viewing portion 16 is retained on the flashlight partially due to the gripping of the split band 21 and also by the use of the protrusion 27 in the folded back tab 23 which meets with the depression 13.

In general, this protrusion/depression 13, 27 insures that the resilient band 21 does not slip toward the left where the cantilevered portion 17 would be pushed off the end of the flashlight body and thus its axis would fall out of the half bearing of hooked end 24. In addition, since the bulb bearing end 11 normally rotates to turn the flashlight on and off, this protrusion/depression helps to keep the attachment from rotating. However, this may not be absolutely necessary.

Figure 5:
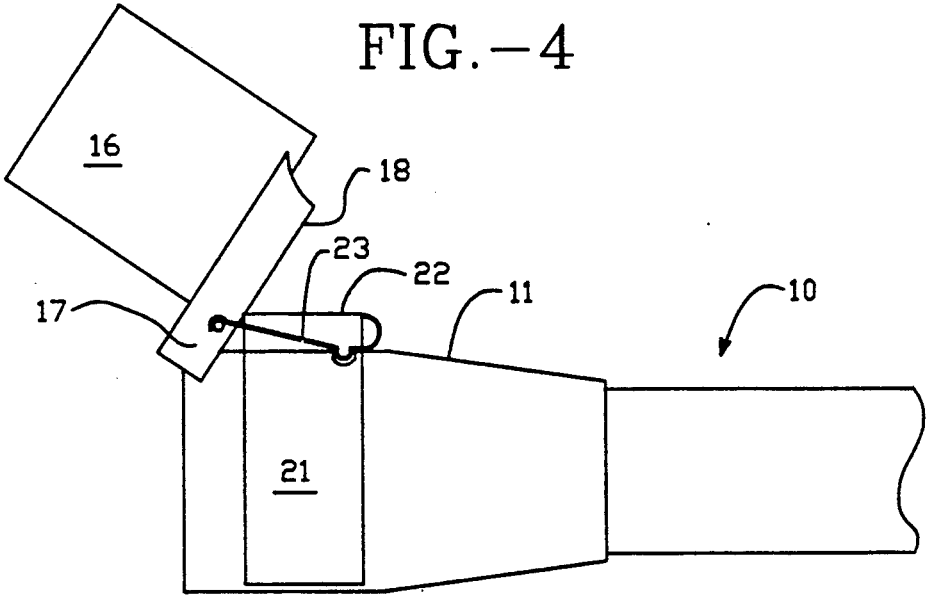
FIG. 5 shows FIG. 2 but with a portion of the magnifying attachment in an oblique position.

FIG. 5 illustrates the eyepiece viewing portion 16 in a 135° oblique illumination position where the raised shoulder 18 actually is stopped by the raised portion 22 of band 21.

Figure 6:
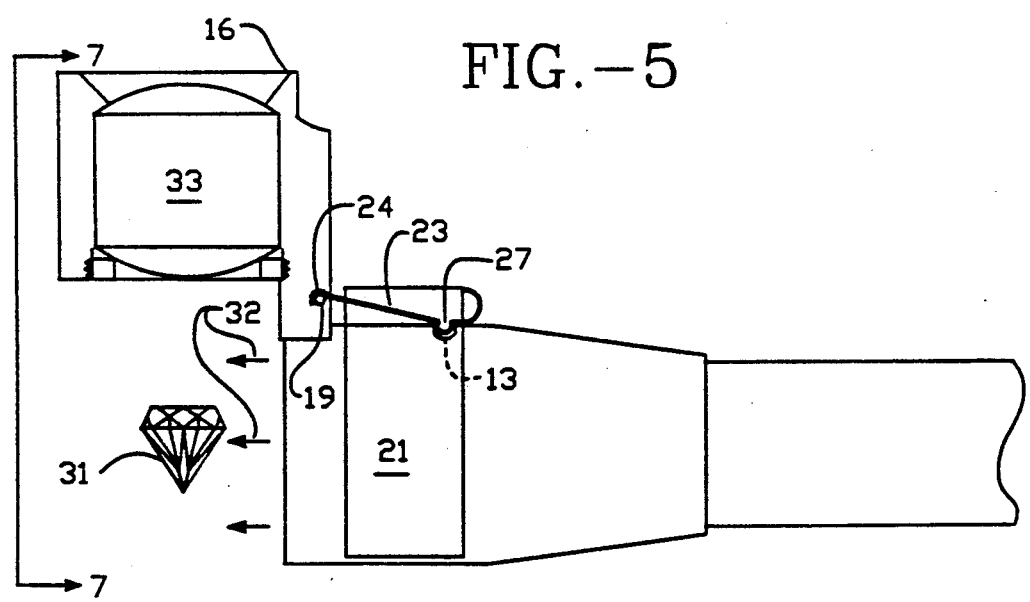
FIG. 6 is a side view similar to FIG. 2 but with the eyepiece portion of the magnifying attachment in an open or 90° viewing position.

Finally FIG. 6 shows the normal dark field illumination 90° position of eyepiece 16 where a gem 31 would be illuminated by rays 32 from the flashlight bulb. Because of geometrical considerations, as discussed in the above Raney patent, none of these rays will reach the viewer looking through magnifying eyepiece 33. Thus there is dark field illimination. The specimen 31 is of course placed at the focus of eyepiece 33.

Figure 3:
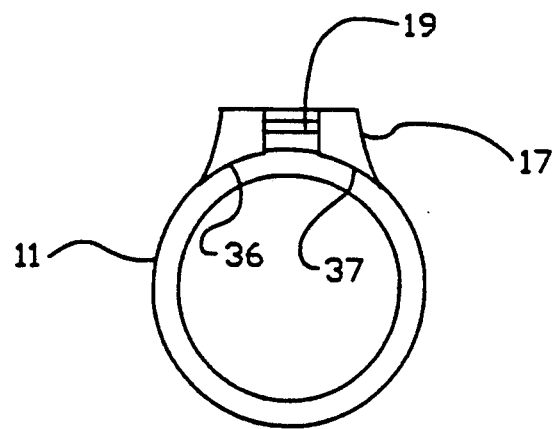
FIG. 3 is a cross sectional view taken along the line 3—3 of FIG. 2.
Figure 7:
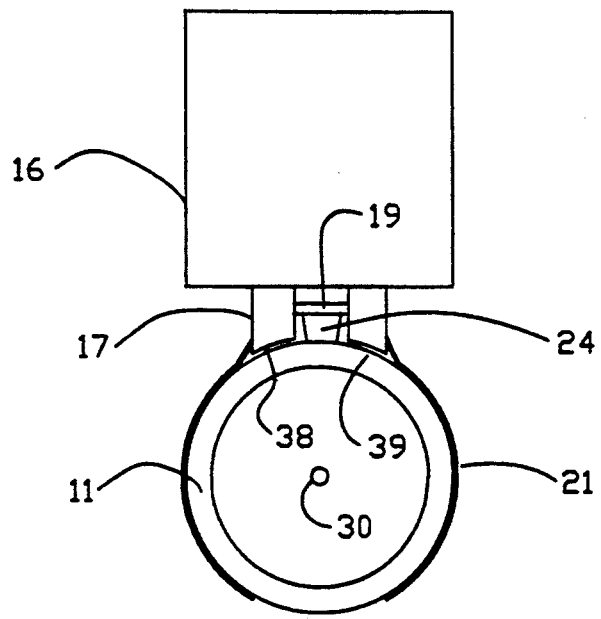
FIG. 7 is a simplified end view taken substantially along the line 7—7 of FIG. 6.

FIGS. 3 and 7 respectively illustrate how the eyepiece viewing portion 16 is retained by the bias of the associated spring tab 23 and resilient band 21 in a closed or stowed position as illustrated in FIGS. 2 and 3 or an open or viewing 90° position illustrated in FIGS. 6 and 7.

Referring first to the closed or stowed position of FIGS. 2 and 3, the cantilevered end 17 has a pair of curved surfaces 36 and 37 which mate with the cylindrical bulb bearing end 11 (the bulb is indicated as being at 30). Similarly, referring to FIG. 7 when eyepiece 16 is in the open or viewing position, the cantilevered end 17 includes a different pair of curved surfaces 38 and 39 (90° away in orientation from the surfaces 36 and 37) which also mate with the cylindrical bulb bearing end 11. Thus the eyepiece viewing portion is firmly held in either of its main positions. And in the closed position as illustrated in FIG. 2, the eyepiece viewing portion 16 becomes an extension of the main flashlight body 10.

Figure 4:
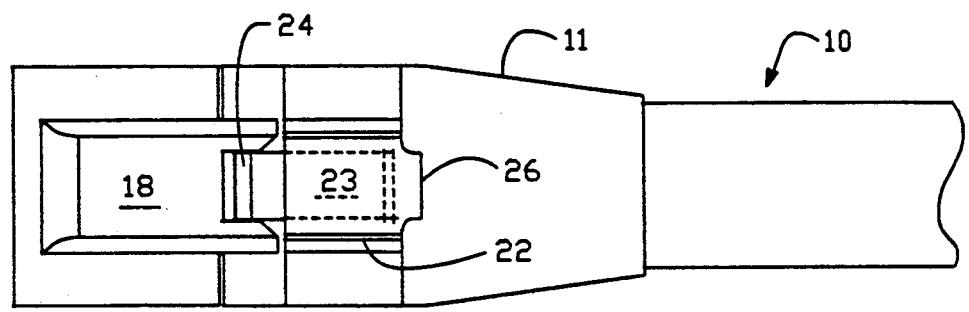
FIG. 4 is a top view taken along the line 4—4 of FIG. 2.

FIG. 4 illustrates the tab 23 as having a width almost as wide as the raised portion 22; and the hooked end portion 24 is also illustrated.

Figure 8:
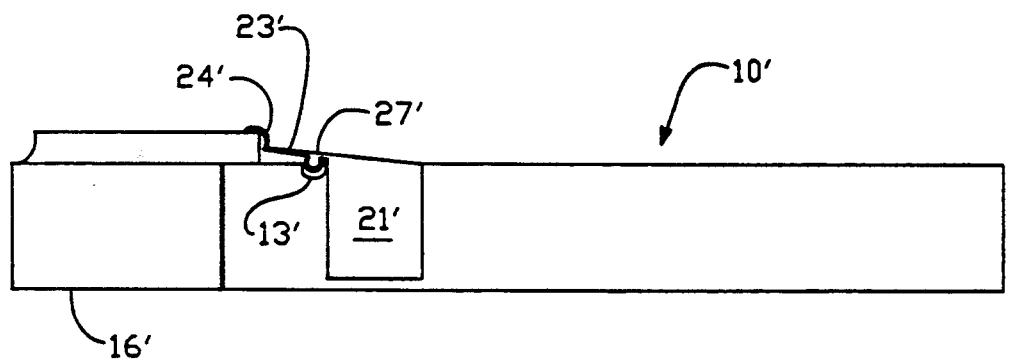
FIG. 8 is a side view similar to FIG. 2 but of an alternative embodiment.
Figure 9:
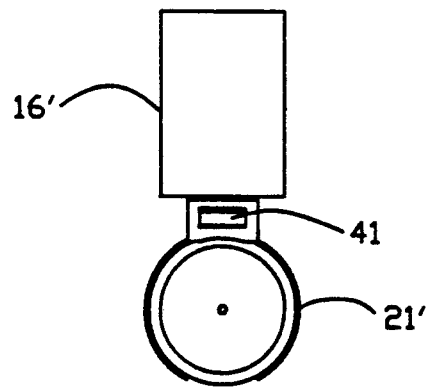
FIG. 9 is a cross sectional view of FIG. 8 showing an eyepiece viewing portion in an open position.

A simplification of the embodiments of FIGS. 1 through 7 is illustrated in FIGS. 8 and 9 where split resilient band 21' is mounted upon a fully cylindrical flashlight body 10' including the bulb bearing end portion 16'. Rather than a curved or folded back tab 23, there is merely an extension tab 23'. Otherwise there is a protrusion/depression 13' and 27', and an end portion 24' which hooks as illustrated in FIG. 9 into a rectangular aperture 41.

To remove the magnifying attachment, the resilient band 21 is rotated and merely pushed off the flashlight body. It is similarly easily slipped on. Thus an improved magnifying attachment has been provided.

What is claimed is:

1. A magnifying attachment having an eyepiece viewing portion for a flashlight body having a substantially cylindrical bulb bearing end, for dark field illumination of a gem specimen when the eye of a viewer observes the specimen through the eyepiece in an open-viewing position to detect inclusions in the specimen comprising:

a split resilient curved band slippable over said cylindrical bulb bearing end and having an axis substantially coincident with the axis of said flashlight body, said resilient band tightly gripping said flashlight body, and said resilient band including as a unitary part, a resilient folded back tab going from said band toward the bulb end of the said flashlight body in a plane substantially parallel to said axis of said flashlight body, and biased against the flashlight body because of said resilient curved band, said tab having a hooked end near said flashlight end forming a half bearing into which a rotational axis of said eyepiece viewing portion may be placed and retained by said bias for rotation between an open or viewing position and a closed or stowed position where said eyepiece portion is an extension of said flashlight body.

2. A magnifying attachment for a flashlight body as in claim 1 where said tab includes a protrusion which mates with a depression in said flashlight body for retaining said band and said eyepiece viewing portion on said flashlight body.

3. A magnifying attachment for a flashlight body as in claim 1 where said tab is folded back under said band to provide increased spring bias against said flashlight body.

4. A magnifying attachment for a flashlight body as in claim 2 where said eyepiece viewing portion is retained in said closed stowed position by first curved surfaces on a cantilevered end of such portion, such surfaces mating with said cylindrical bulb bearing end and being biased against said end by said tab.

5. A magnifying attachment for a flashlight body as in claim 2 where said eyepiece viewing portion is retained in said open viewing position by second curved surfaces on a cantilevered end of such portion, such surfaces mating with said cylindrical bulb bearing end and being biased against said end by said tab.

6. A magnifying attachment as in claim 2 where said bulb bearing end is rotable for actuating said flashlight and said band is fixed for rotation therewith by said gripping and said protrusion/depression.

7. A magnifying attachment as in claim 3 where said band includes a raised portion to accommodate said folded back tab which also serves as a stop when said eyepiece viewing portion is rotated to an oblique position.

* * * * *